United States Patent [19]
Eschbaugh

[11] 3,826,523
[45] July 30, 1974

[54] QUICK CONNECT TUBE COUPLING JOINT

[75] Inventor: John T. Eschbaugh, Chesterland, Ohio

[73] Assignee: Parker-Hannifin Corporation, Cleveland, Ohio

[22] Filed: Nov. 22, 1972

[21] Appl. No.: 308,804

[52] U.S. Cl............ 285/39, 285/319, 285/DIG. 22, 285/DIG. 25
[51] Int. Cl............................................. F16l 35/00
[58] Field of Search ...... 285/14, DIG. 25, 319, 321, 285/317, 39, 356, DIG. 22; 137/583

[56] References Cited
UNITED STATES PATENTS

| | | | |
|---|---|---|---|
| 2,441,344 | 5/1948 | Bosworth | 285/321 |
| 2,444,888 | 7/1948 | Baumgardner | 285/DIG. 22 |
| 2,898,130 | 8/1959 | Hansen | 285/321 X |
| 3,245,703 | 4/1966 | Manly | 285/319 |
| 3,453,005 | 7/1969 | Foults | 285/321 X |
| 3,540,760 | 11/1970 | Miller et al. | 285/DIG. 25 |
| 3,711,125 | 1/1973 | Dehar | 285/319 X |
| 3,718,350 | 2/1973 | Klein | 285/321 X |

*Primary Examiner*—Thomas F. Callaghan
*Attorney, Agent, or Firm*—John N. Wolfram

[57] ABSTRACT

A tube coupling joint in which a beaded tube with a packing ring and a collet with spring fingers mounted on the tube is attached to a coupling body by simply pushing the tube into the body. Upon such insertion the collet fingers spring radially behind a shoulder in the nut to prevent withdrawal of the tube. The spring fingers are accessible from the exterior of the body to radially deflect the same inwardly for releasing the collet to permit withdrawal of the tube from the housing. Also, at least one of the collet fingers is axially offset from the others for engaging the body shoulder after release of the initially engaged collet fingers and breaking of the coupling seal by partial withdrawal of the tube to thus provide a safety measure in that the tube is retained by the coupling while fluid pressure is being bled therefrom.

7 Claims, 3 Drawing Figures

QUICK CONNECT TUBE COUPLING JOINT

BACKGROUND OF THE INVENTION

In high production final assembly operations, as for automotive air conditioning units, it is desirable to accomplish assembly of tubing lines to compressors and other components in as little time as possible. Toward this end, tubing lines and coupling components are prefabricated and preassembled as much as possible so that the coupling operation on the final assembly line will be simple and quick.

Presently, tube couplings such as shown in U.S. Pat. No. 3,092,404 are used in such production lines but these require that the assembler thread a tube coupling nut onto the body on the final assembly line.

Another form of coupling that is shown in U.S. Pat. No. 3,453,005, U shaped spring clips are substituted for a threaded connection between the nut and body and the tube may be assembled to the body by simply pushing it therein. Two clips are provided, one for maintaining the parts in the completely coupled and sealed position, and the other to maintain the tube in a partially withdrawn position whereby pressure may be bled from the line before the tube is completely released from the body. However, this coupling is very bulky and requires considerable radial clearance with other components of a system in order to release the clips.

SUMMARY OF THE INVENTION

The present invention provides a tube coupling in which a collet with spring fingers having radially projecting lugs thereon is positioned behind a bead on the tube. The collet and tube are inserted into a tube coupling body that has a radial shoulder therein. When the collet is completely inserted, the fingers spring outwardly so that the lugs engage the shoulder to prevent withdrawal of the collet and tube. The fingers are accessible from the exterior of the body for deflecting them radially inwardly to release the lugs from the shoulder so that the tube and collet can be withdrawn. Preferably, at least one of the collet fingers has a lug spaced axially inwardly of the other lugs and which engages the body shoulder when the tube has been partially withdrawn and the seal broken to thus retain the tube while pressure bleeds from the line. This last mentioned finger is also accessible from the exterior of the body so that it may be released from the shoulder and permit complete withdrawal of the tube from the body after the line has been depressurized.

The fingers are accessible from the exterior of the coupling body either by permitting them to project axially therefrom, or by providing radial openings in the body through which a tool may be inserted for releasing the fingers.

DETAIL DESCRIPTION

Figure 1:
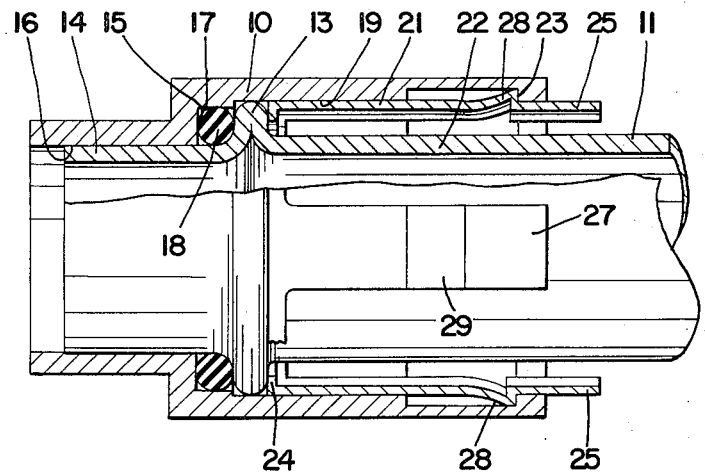
FIG. 1 is a cross section view of one form of the coupling.

In the coupling shown in FIG. 1 there is a body 10 to which a tube 11 is attached. The tube has a bead or abutment 13 formed thereon and preferably the front portion 14 of the tube has been swaged to a slightly smaller diameter than the normal and remaining portion of the tube.

Body 10 has a first bore 16 to receive tube portion 14, a first counterbore 17 for receiving an O ring 18 and a second counterbore 19 for receiving collet 21. Near the outer end of the counterbore 19 is a circular recess 22 that provides a transverse shoulder 23 in the body.

Collet 21 has an inturned annular continuous flange 24 that butts against bead 13 and has a plurality of axially extending fingers, two of which, 25, are longer than another pair 27. Fingers 25 have outwardly projecting lugs 28 thereupon and fingers 27 have outwardly projecting lugs 29. Lugs 29 are spaced axially inwardly of lugs 28. Fingers 25 project from the end of body 10 but preferably fingers 27 do not project therefrom when the coupling is fully assembled, as shown.

OPERATION OF FIG. 1 FORM

Tube 11 with collet 21 thereon is preformed to form bead 13 and the reduced diameter portion 14 and O ring 18 is then assembled thereto. Body 10 is either preformed as a separate member or as part of a housing of some larger unit. When the parts are brought to the final assembly line, the tube, with the O ring and collet thereon, is pushed into the body. During insertion, the spring fingers deflect radially inwardly at their ends to permit lugs 28, 29 to enter bore 19. When lugs 28, 29 are opposite recess 22 the fingers spring outwardly again so that the lugs will be axially opposite shoulder 23. When the collet is inserted all the way, lugs 29 on the short fingers 27 will be axially spaced from shoulder 23 but lugs 28 on the long fingers 25 will engage the shoulder to prevent withdrawal of the collet. At this time, packing ring 18 is in sealing engagement with counterbore 17 and tube front end portion 14 and, if desired may be somewhat axially compressed between shoulder 15 and bead 13 to put a rearward force on the tube and on the collet to keep lugs 28 firmly against shoulder 23 whereby the collet is not loose within the coupling.

To disconnect the tube from body 10, the outer ends of fingers 25 that project from the body may be radially deflected by hand or with a tool to release lugs 28 from shoulder 23. If there is pressure in the line it will force the tube and collet in an outward direction until lugs 29 on the shoulder fingers 27 engage shoulder 23. At this time O ring 18 will be withdrawn from counterbore 17 and into counterbore 19 with which it has a radial clearance. This permits fluid to bleed from the line past the O ring and bead 13, which has a slight clearance with counterbore 19, for dropping the pressure in the line. Fingers 27, which now project from body 10, may then be deflected radially inwardly for releasing lugs 29 from shoulder 23 and the collet and tube can be completely withdrawn from the body.

FIGS. 2 AND 3 FORMS

Figure 2:
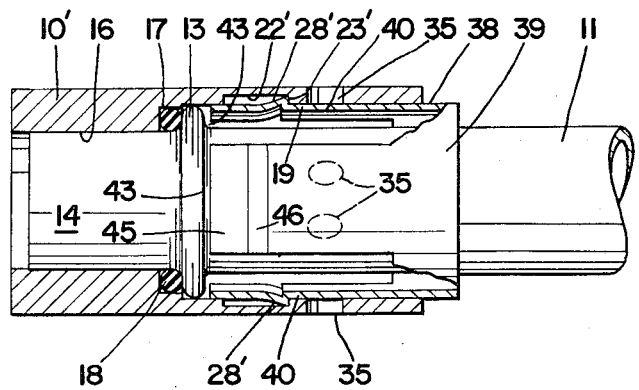
FIGS. 2 and 3 are cross section views of modified forms of the coupling.

In the form of coupling shown in FIG. 2, tube 11, bead 13 and O ring 18 are the same as in FIG. 1 and fit within a body bore 16 and counterbores 17 and 19 in a body 10' in the same manner as in FIG. 1. However, body 10' has a series of circumferentially spaced radial openings 35 toward its outer end and a recess 22' forming a transverse shoulder 23' is between openings 35 and counterbore 17.

In this instance, collet 38 has a cylindrical portion 39 at its rear end and there are several fingers 40 that extend forwardly but which may have a slight axial clearance 43 with tube bead 13. Fingers 40 have lugs 28' in engagement with shoulder 23' in this position of the coupling parts.

Collet 38 also has several additional fingers 45 having outwardly projecting lugs 46 thereon that are axially spaced from lugs 28' and which also have a slight axial clearance 43 with bead 13.

To make final assembly of the coupling of FIG. 2, tube 11, with the O ring and collet 38 thereon is pushed into body 10'. As first lugs 46 and then lugs 28' enter the outer end of bore 19, these lugs, with their fingers are deflected radially inwardly until the lugs are opposite recess 22', at which time they spring radially outwardly and lugs 28' will engage shoulder 23' while lugs 46 will be axially spaced therefrom. Axial clearances 43 permit complete insertion of the collet without requiring axial compression of O ring 18 between body 10' and bead 13 to thus facilitate final assembly. Upon application of fluid pressure tube 11 may move outward slightly until bead 13 engages the fingers but this does not permit O ring 18 to come out of counterbore 17.

To disassemble the coupling, a tool is inserted through openings 35 that are opposite fingers 40 for radially depressing the latter to release lugs 28' from shoulder 23'. There are enough openings 35 so that all of the fingers will at all times be exposed to one of such openings.

Upon release of lugs 28' from shoulder 23', the tube and collet will move back until lugs 46 engage shoulder 23'. At this time packing 17 is within bore 19 for relieving fluid pressure in a manner already described. When the pressure has been released, a tool may be inserted into the appropriate openings 35 for radially deflecting fingers 45 for releasing lugs 46 from shoulder 23' so that the tube and collet can be completely withdrawn from the body.

Figure 3:
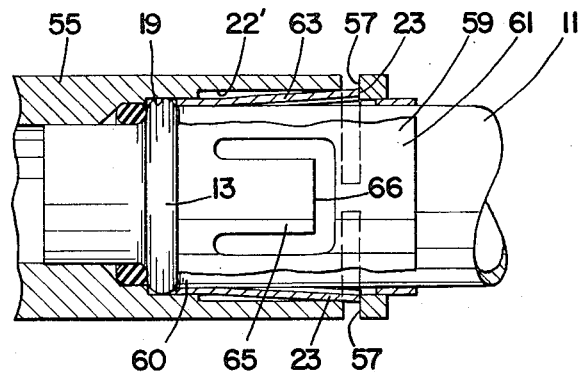

In the form of coupling shown in FIG. 3, the body and collet are of somewhat different form than in FIG. 2. Thus, body 55 has a bore 19 for receiving tube bead 13 and a collet 56 and there is an elongated recess 22' that forms a holding shoulder 23' at its one end. Body 55 has two or more radial slots 57.

Collet 59 has a cylindrical portion 60 at its inner end and a cylindrical portion 61 at its outer end. A pair of relatively long spring fingers 63 extend from the inner portion 60 and flare outwardly so that their free ends will be within recess 22' and in engagement with shoulder 23' when the coupling is fully assembled, as shown.

Collet 59 also has one or more relatively short fingers 65 extending rearwardly from inner end 60 and whose free ends 66 are also normally axially opposite shoulder 23' but spaced therefrom when the coupling is fully assembled.

To make final assembly of the coupling, the tube with the packing and collet 59 thereon is inserted into body member 55 until fingers 63 and 65 have snapped outwardly into recess 22' and the free ends of fingers 63 are in engagement with shoulder 23'.

To disassemble the coupling, a tool is inserted into slots 57 to depress fingers 63 for releasing them from shoulder 23', at which time the tube and collet can be partially withdrawn to the point where fingers 65 engage shoulder 23' for holding the parts together while pressure bleeds from the coupling. Fingers 65 may then be depressed in the same manner as fingers 63 for releasing them from shoulder 23' so that the tube and collet may be completely withdrawn from the body.

I claim:

1. A tube coupling joint comprising a body having an opening therethrough and a forwardly facing shoulder spaced from an outer end of said opening and extending radially therefrom, a tube having an external abutment thereon, a resilient packing between the abutment and body and axially compressed into direct engagement therewith, a collet on the tube having a front end engaging the abutment and having spring fingers, a lug on each finger extending radially outwardly therefrom and engaging the shoulder to retain the tube and collet in the body, means making the fingers accessible from the exterior of the body whereby the fingers may be deflected radially inwardly for releasing the lugs from the shoulder so that the tube and collet may be withdrawn from the body, at least one of said fingers having a radial lug axially spaced from said shoulder in a first axial position of said collet when other lugs are in engagement with said shoulder and which is engageable with said shoulder in a second axial position of said collet when said other lugs are disengaged therefrom and the collet is partially withdrawn from said body.

2. The joint of claim 1 in which said means comprises radial openings in said body.

3. The coupling of claim 1 in which said one finger is completely within said body when said other lugs are engaged with said shoulder and said one finger projects from said body when said axially spaced lug is engaged with said shoulder whereby said one finger is exteriorly accessible for deflection radially inwardly only when the collet is partially withdrawn from the body as aforesaid.

4. The coupling of claim 1 in which said body has a first counterbore to receive said packing and a second and larger counterbore to receive said abutment, said packing being within said first counterbore and in sealing engagement therewith when said other lugs are in engagement with said shoulder, and said packing is in said second counterbore and out of engagement therewith when said axially spaced lug is in engagement with said shoulder, and a portion of said collet has a close sliding fit in said second counterbore in both said axial positions of said collet.

5. The coupling of claim 1 in which said collet has a cylindrical portion at its inner end engageable with said abutment and a continuous cylindrical portion at its outer end, and said fingers extend between said ends.

6. The coupling of claim 2 in which said radial openings comprise slots through said body axially inwardly of said shoulder.

7. A tube coupling joint comprising a body having in succession a bore, a first counterbore larger in diameter than the bore and a second counterbore larger in diameter than the first counterbore and a forwardly facing radial shoulder, a tube having an external bead spaced from an end of the tube to provide the tube with a front tubular portion that extends into said bore, said bead being located in said second counterbore, a packing ring of resilient material on said front tubular portion in said first counterbore and in sealing engagement with said front tubular portion and said first counterbore, a collet on the tube entirely behind said bead and having a continuous circular portion engageable therewith, said collet including axially extending spring fingers connected to said circular portion and each having a rearwardly facing radial surface thereon engageable with said shoulder to retain the tube and collet within the body, said circular portion being within said second counterbore, said fingers in the vicinity of said radial surfaces being radially spaced from the surface of said tube whereby the fingers at said radial surfaces may be deflected radially inwardly until said radial surfaces disengage from said shoulder, means accessible to the exterior of the body whereby the fingers may be so radially deflected, said body having a circular recess of larger diameter than said second counterbore and said shoulder is an end wall of said recess, said bead having a diameter greater than the diameter of the first counterbore and which is a slide fit within the second counterbore, said collet having at least one other finger that is shorter than the first mentioned fingers and that has a rearwardly facing radial surface thereon that is axially inwardly spaced from said shoulder whereby when said first mentioned radial surfaces engage said shoulder said spaced radial surface is inwardly spaced from said shoulder and said other finger is substantially inaccessible from the exterior of the body whereby upon release of said first mentioned radial surfaces from said shoulder the tube and collet may be partially withdrawn from the body until said spaced radial surface engages said shoulder to thereby expose said other finger and to withdraw said packing ring from sealing contact with said first counterbore.

* * * * *